United States Patent
Qin et al.

(10) Patent No.: US 11,747,660 B2
(45) Date of Patent: Sep. 5, 2023

(54) DEGASSING MACHINE AND DEGASSING SYSTEM

(71) Applicant: HKC CORPORATION LIMITED, Shenzhen (CN)

(72) Inventors: Lin Qin, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 57 days.

(21) Appl. No.: 17/190,882

(22) Filed: Mar. 3, 2021

(65) Prior Publication Data
US 2022/0035184 A1  Feb. 3, 2022

(30) Foreign Application Priority Data

Jul. 28, 2020  (CN) .......................... 202010742963.4
Jul. 28, 2020  (CN) .......................... 202021543618.X (51) Int. Cl.
*G02F 1/13*  (2006.01)
*B32B 37/06*  (2006.01)

(52) U.S. Cl.
CPC ............ *G02F 1/1303* (2013.01); *B32B 37/06* (2013.01); *B32B 2457/202* (2013.01)

(58) Field of Classification Search
CPC .............. B32B 37/06; B32B 2457/202; B32B 17/10972; G02F 1/1303
See application file for complete search history.

(56) References Cited

U.S. PATENT DOCUMENTS

2019/0096715 A1\*  3/2019  Lodder ............. H01L 21/67109
2020/0169029 A1\*  5/2020  Sun ........................ H01R 41/00

FOREIGN PATENT DOCUMENTS

| CN | 109665726 A | \* | 4/2019 |
| CN | 109955472 A |   | 7/2019 |
| CN | 209265591 U |   | 8/2019 |
| CN | 111224250 A |   | 6/2020 |

OTHER PUBLICATIONS

First Office Action issued in counterpart Chinese Patent Application No. 202010742963.4, dated Aug. 31, 2022.

\* cited by examiner

*Primary Examiner* — George R Koch
(74) *Attorney, Agent, or Firm* — Westbridge IP LLC (57) ABSTRACT

Disclosed are a degassing machine and a degassing system. The degassing machine includes a machine body defined with a containing groove, an inner wall of the containing groove being provided with an electric control terminal; and a furnace body including: an upper cover fixed on a wall of the containing groove and a drawer slidably provided in the containing groove. The drawer is provided with a contact terminal corresponding to the electric control terminal, and is for placing a workpiece.

16 Claims, 6 Drawing Sheets

DEGASSING MACHINE AND DEGASSING SYSTEM

CROSS-REFERENCE TO RELATED APPLICATIONS

The present disclosure claims priority to Chinese Application Nos. 202010742963.4 and 202021543618.X, both filed on Jul. 28, 2020, the entire disclosure of which are incorporated herein by reference.

TECHNICAL FIELD

The present disclosure relates to the technical field of degassing device, in particular to a degassing machine and a degassing system applying the degassing machine.

BACKGROUND

When manufacturing a display module, a degassing machine is needed to remove bubbles between the liquid crystal display panel and the polarizer. A common degassing machine includes a furnace body and a whole machine, and the whole machine is provided with a containing cavity. After the furnace body slides into the containing cavity, the whole machine cooperates with the furnace body to heat and pressurize the product to remove the bubbles. Since there are circuits such as power lines and temperature sensing wires on the furnace body, the furnace body repeats to slide into or away from the containing cavity for a long time, resulting in frequent folding of the circuit and circuit breakage, and ultimately affecting the stable operation of the degassing machine.

The above content is only used to assist the understanding of the technical solution of the present disclosure, which does not mean that the above content is recognized as prior art.

SUMMARY

The present disclosure provides a degassing machine applied to a degassing system, including: a machine body defined with a containing groove, an inner wall of the containing groove being provided with an electric control terminal; and a furnace body, including: an upper cover fixed on a wall of the containing groove; and a drawer slidably provided in the containing groove, the drawer is provided with a contact terminal corresponding to the electric control terminal, and is for placing a workpiece, the drawer is for sliding into the containing groove, and covered by the upper cover, and the contact terminal is connected with the electric control terminal to energize the drawer.

In an embodiment of the present disclosure, one of the contact terminal and the electric control terminal is provided with at least one conductive elastic piece, and another of the contact terminal and the electric control terminal is provided with a conductive plate corresponding to the conductive elastic piece; and after the drawer slides into the containing groove, the conductive elastic piece is elastically abutted against the conductive plate.

In an embodiment of the present disclosure, the drawer includes a plate body slidably provided in the containing groove, a heater, and a heat conducting plate connected to the plate body; the plate body is provided with a positioning groove for placing the workpiece; the heater and the heat conducting plate are provided in the positioning groove; the heater is between the heat conducting plate and a bottom wall of the positioning groove; and the contact terminal is provided on the plate body and electrically connected to the heater.

In an embodiment of the present disclosure, the plate body is provided with a wedge-shaped edge adjacent to a notch of the positioning groove; the wedge-shaped edge surrounds the notch of the positioning groove; and the wedge-shaped edge is inclined from an outer side of the plate body to a wall of the positioning groove.

In an embodiment of the present disclosure, the plate body is further defined with a sealing groove adjacent to the notch of the positioning groove; and the sealing groove surrounds an outer periphery of the wedge-shaped edge.

In an embodiment of the present disclosure, the drawer further includes a sealing ring provided in the sealing groove; the sealing ring is provided with an air passage; the degassing system includes an air source mechanism; and the air passage is in communication with the air source mechanism.

In an embodiment of the present disclosure, the drawer further includes a drag chain along one side of the plate body and a hose provided in the drag chain; the plate body is provided with an air hole communicating with the sealing groove; and one end of the hose passes through the air hole to communicate with the air passage, and another end of the hose is in communication with the air source mechanism.

In an embodiment of the present disclosure, at least two slide rails are provided on a side of the drawer away from the upper cover; the wall of the containing groove is provided with a slide way corresponding to each of the at least two slide rails; and each of the at least two slide rails is slidably provided in a corresponding slide way.

In an embodiment of the present disclosure, the upper cover is provided with an air flow channel; the degassing machine includes a pressure control mechanism; the positioning groove is covered by the upper cover; and the air flow channel is in communication with the positioning groove and the pressure control mechanism.

In an embodiment of the present disclosure, the degassing machine further includes a driving mechanism provided in the containing groove; the driving mechanism is adjacent to the drawer; and an output shaft of the driving mechanism is connected to the drawer.

In an embodiment of the present disclosure, the plate body is provided with a wire hole communicating with the positioning groove, the contact terminal is provided on the plate body, and the contact terminal is electrically connected to the heater via the wire hole.

In an embodiment of the present disclosure, the degassing machine also includes a master control circuit, the electric control terminal is electrically connected to the master control circuit, and the master control circuit is for transmitting electric signals to the drawer through the electric control terminal and the contact terminal.

In an embodiment of the present disclosure, the contact terminal and the electric control terminal are shrapnel type connectors.

In an embodiment of the present disclosure, at least one outer cover is provided on the contact terminal and/or the electric control terminal, and the at least one outer cover surrounds the contact end terminal and/or the electric control terminal.

The present disclosure further provides a degassing machine applied to a degassing system, including: a machine body defined with a containing groove, an inner wall of the containing groove being provided with an electric control terminal; a furnace body including an upper cover fixed on a wall of the containing groove and a drawer slidably provided in the containing groove, the drawer being provided with a contact terminal corresponding to the electric control terminal, a side of the drawer facing the upper cover being provided with a positioning groove for placing a workpiece, the upper cover being provided with an air flow channel; and a master control circuit provided in the machine body and electrically connected to the electric control terminal; the degassing system includes a pressure control mechanism, and the pressure control mechanism is in communication with the air flow channel; the drawer is for sliding into the containing groove and covered by the upper cover, the pressure control mechanism is in communication with the positioning groove through the air flow channel, and the contact terminal is connected to the electric control terminal.

The present disclosure further provides a degassing system, including the degassing machine as described above and a sucker mechanism adjacent to the degassing machine.

In technical solutions of the present disclosure, the electric control terminal is provided in the containing groove of the machine body, and the contact terminal is provided on the drawer. When the drawer slides into the containing groove, the upper cover covers the drawer, and the contact terminal is connected with the electric control terminal to energize the drawer, so as to avoid the movement of the cable carried by the drawer and avoid breakage. The contact terminal is connected with the electric control terminal to avoid installing a control cable on the drawer, simplifying the assembly structure of the drawer, improving the integration of the degassing machine, and enhancing the working stability of the degassing machine.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

It should be noted that, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the meaning of "and/or" appearing in the disclosure includes three parallel scenarios. For example, "A and/or B" includes only A, or only B, or both A and B. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

The present disclosure provides a degassing machine. As shown in FIG. 1 to FIG. 5, the degassing machine includes a machine body 1 and a furnace body.

Figure 1:
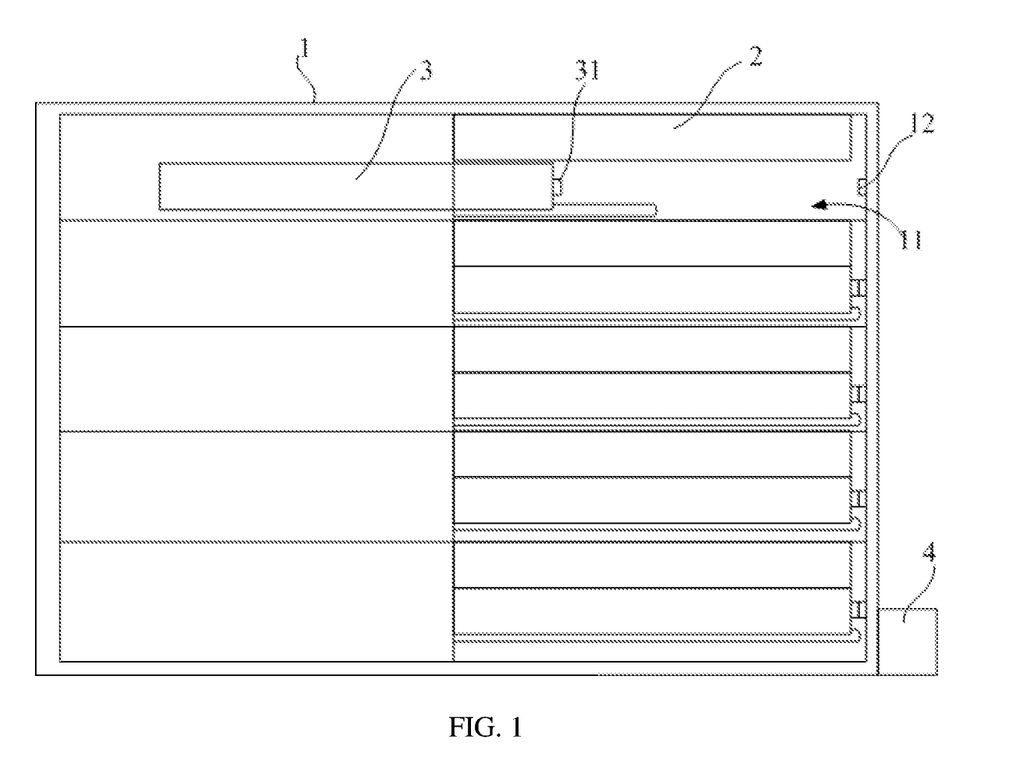
FIG. 1 is a schematic cross-sectional structural diagram of a degassing machine according to an embodiment of the present disclosure.
Figure 2:
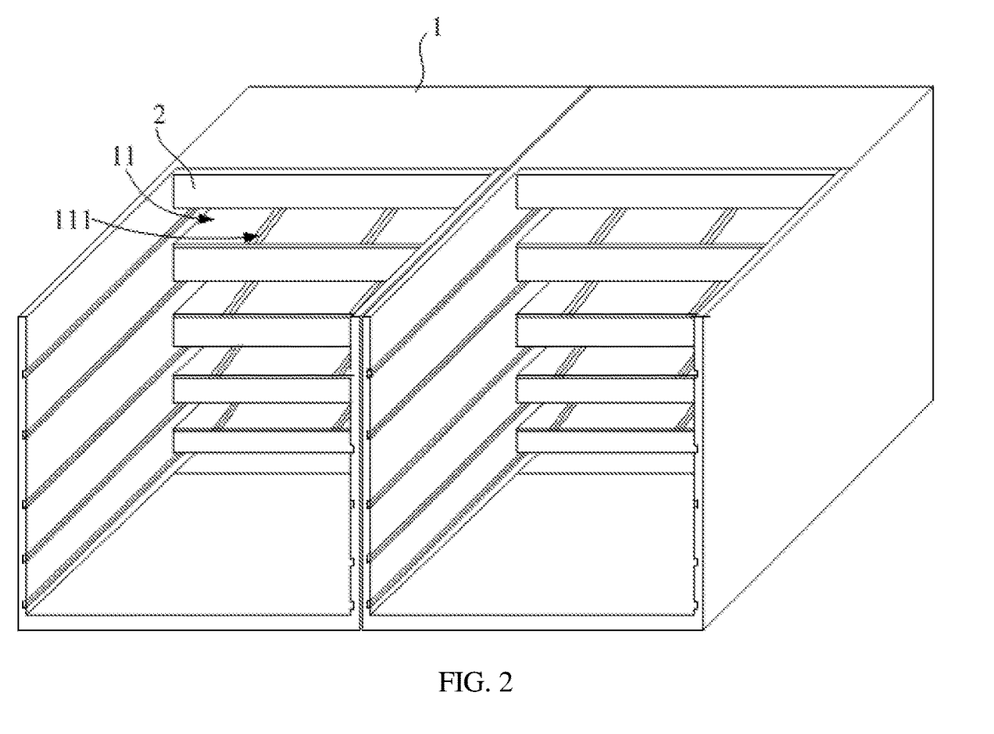
FIG. 2 is a partial schematic structural diagram of the degassing machine in FIG. 1.

The machine body 1 is provided with a containing groove 11, and an inner wall of the containing groove 11 is provided with an electric control terminal 12. In order to meet the processing requirements, the degassing machine can simultaneously deaerate multiple workpieces. The machine body 1 may be provided with a plurality of containing grooves 11, and each of the containing grooves 11 is provided with a furnace body. It can be understood that a common workpiece is an object covered with a membrane, there are bubbles between the object and the membrane, and the degassing machine is used to remove the bubbles.

The furnace body includes an upper cover 2 fixed on a wall of the containing groove 11 and a drawer 3 slidably provided in the containing groove 11. The drawer 3 is provided with a contact terminal 31 corresponding to the electric control terminal 12, and is for placing a workpiece. The drawer 3 slides into the containing groove 11, the drawer 3 is covered by the upper cover 2, and the contact terminal 31 is connected with the electric control terminal 12 to energize the drawer 3.

There are air bubbles between the object and the membrane. When the upper cover 2 covers the drawer 3, a closed space is formed between the upper cover 2 and the wall of the drawer 3, and the closed space is pressurized and heated, so that the air bubbles are discharged between the membrane and the object.

In some embodiments of the present disclosure, the electric control terminal 12 is provided in the containing groove 11 of the machine body 1, and the contact terminal 31 is provided on the drawer 3. When the drawer 3 slides into the containing groove 11, the upper cover 2 covers the drawer 3, and the contact terminal 31 is connected with the electric control terminal 12 to energize the drawer 3, so as to avoid the movement of the cable carried by the drawer 3 and avoid breakage. The contact terminal 31 is connected with the electric control terminal 12 to avoid installing a control cable on the drawer 3, simplifying the assembly structure of the drawer 3, improving the integration of the degassing machine, and enhancing the working stability of the degassing machine.

It can be understood that the degassing machine also includes a master control circuit 4, and the electric control terminal 12 is electrically connected to the master control circuit 4. The master control circuit 4 transmits electrical signals to the drawer 3 through the electrical control terminal 12 and the contact terminal 31 to control the drawer 3 to generate heat.

In order to facilitate the connection between the contact terminal 31 and the electric control terminal 12 and improve the stability of the connection between the contact terminal 31 and the electric control terminal 12, in some embodiments, the contact terminal 31 may be electrically connected to the electric control terminal 12 in a contact type. The contact terminal 31 may also be electrically connected to the electric control terminal 12 by shrapnel contact. The contact terminal 31 may also be electrically connected to the electric control terminal 12 in a plug type. The connection manner between the contact terminal 31 and the electric control terminal 12 is not limited here.

In order to improve the stability of the connection between the contact terminal 31 and the electric control terminal 12, the contact terminal 31 and the electric control terminal 12 may be shrapnel type connectors.

In order to avoid damage to the device due to discharge when the contact terminal 31 is connected to the electric control terminal 12, when the contact terminal 31 is separated from the electric control terminal 12, the master control circuit 4 recognizes that the electric control terminal 12 is in a non-contact state, and switches the electric control terminal 12 to be a open circuit. That is, when the contact terminal 31 is separated from the electric control terminal 12, the electric control terminal 12 is in a state of no current or no voltage, which avoids the occurrence of safety accidents and improves the service life of the device. On the other hand, when the contact terminal 31 is in contact with the electric control terminal 12, the master control circuit 4 recognizes that the electric control terminal 12 remains in an unconnected state, that is, the electric control terminal 12 is in a state of no current and no voltage. When the contact terminal 31 is in contact with the electric control terminal 12 and after a predetermined time, the master control circuit 4 is connected to the electric control terminal 12, and the electric control terminal 12 is in a state of current and voltage existing. In this way, the accident of sparks occurring at the moment of contact between the contact terminal 31 and the electronic control terminal 12 is avoided, the safety of the device is ensured, and the service life of the device is increased.

In order to avoid damage to the device due to discharge when the contact terminal 31 is connected to the electric control terminal 12, at least one outer cover may be provided on the contact terminal 31 and/or the electric control terminal 12, and the outer cover surrounds the contact terminal 31 and/or the electric control terminal 12. When the contact terminal 31 is close to the electric control terminal 12, the outer cover is covered on the outer periphery of the contact terminal 31 and the electric control terminal 12 to avoid accidents of spark damage to the device caused by the discharge of the contact terminal 31 and the electric control terminal 12.

In an embodiment of the present disclosure, one of the contact terminal 31 and the electric control terminal 12 is provided with at least one conductive elastic piece, and another of the contact terminal 31 and the electric control terminal 12 is provided with a conductive plate corresponding to the conductive elastic piece. The drawer 3 slides into the containing groove 11, and the conductive elastic piece is elastically abutted against the conductive plate.

In an embodiment of the present disclosure, the conductive elastic piece elastically abuts against the conductive plate to improve the alignment stability between the contact terminal 31 and the electronic control terminal 12, thereby avoiding that there is a gap between the contact terminal 31 and the electronic control terminal 12, resulting in inability to align.

It can be understood that the contact terminal 31 includes a power input terminal and a control terminal, and the control terminal is used to control the heating intensity of the drawer 3. The drawer 3 is also provided with a temperature sensor. The temperature sensor is electrically connected to the electric control terminal 12 in a contact type, so as to collect the temperature condition of the drawer 3, and then adjust the degree of heat generation to avoid damage to the workpiece.

That is, the contact terminal 31 may include a plurality of access ports, and a plurality of contact terminals are provided on the contact terminal 31 to facilitate electrical connection with the electric control terminal 12. Understandably, the degassing machine includes a power supply circuit and multiple control circuits. The access port provided on the contact terminal 31 can be set corresponding to the power supply circuit and multiple control circuits according to actual use requirements, so that the master control circuit 4 can control the furnace body to realize the degassing process. As long as the contact terminal 31 is connected to the electric control terminal 12 and the master control circuit 4 is used to control the furnace body to perform the degassing process, the number of ports of the contact terminal 31 is not limited here.

Figure 3:
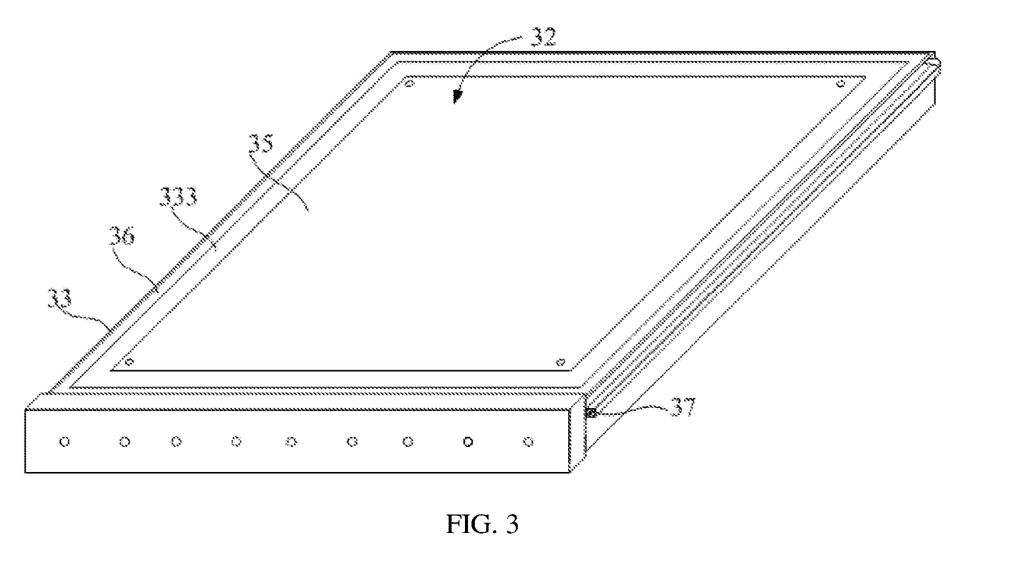
FIG. 3 is a schematic structural diagram of a drawer in FIG. 1.
Figure 5:
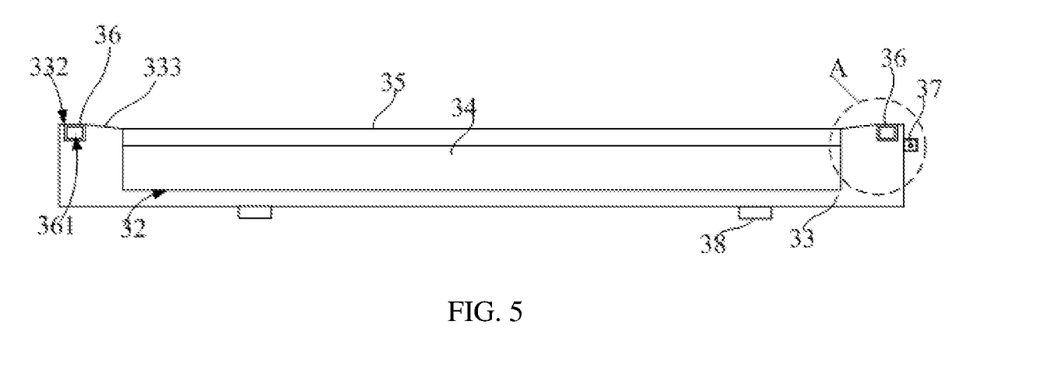
FIG. 5 is a schematic cross-sectional structural diagram of the drawer in FIG. 4.

In an embodiment of the present disclosure, the drawer 3 includes a plate body 33 slidably provided in the containing groove 11, a heater 34, and a heat conducting plate 35 connected to the plate body 33. The plate body 33 is provided with a positioning groove 32 facing the side of the upper cover 2. The positioning groove 32 is for placing the workpiece. The heater 34 and the heat conducting plate 35 are provided in the positioning groove 33. The heater 34 is between the heat conducting plate 35 and a bottom wall of the positioning groove 32. The contact terminal 31 is provided on the plate body 33 and electrically connected to the heater 34.

In an embodiment of the present disclosure, the heater 34 is covered with a heat conducting plate 35, and the heat generated by the heater 34 is discharged through the heat conducting plate 35 to avoid direct contact between the heater 34 and the workpiece, avoid overheating the workpiece, and improve the yield of the product.

In order to satisfy the pressure and heat treatment of the workpiece, the plate body 33 is made of rigid material. In other words, the plate body 33 may be made of alloy material to prevent the plate body 33 from being damaged due to the pressurization of the enclosed space. On the other hand, the upper cover 2 is also made of rigid material.

In another embodiment of the present disclosure, the plate body 33 is provided with a wire hole communicating with the positioning groove 32, the contact terminal 31 is provided on the plate body 33, and the contact terminal 31 passes through the wire hole and is electrically connected to the heater 34.

It should be understood that the contact terminal 31 is provided on a side of the plate body 33 facing the containing groove 11, and the electronic control terminal 12 is provided on the bottom wall of the containing groove 11. On the other hand, under the premise that the contact terminal 31 contacts the electrical control terminal 12, the contact terminal 31 is provided on the side of the plate body 33, and the electrical control terminal 12 can also be provided on the side wall of the containing groove 11.

It should be understood that the heat conducting plate 35 may be provided with at least one mounting hole. The bottom wall of the positioning groove 32 is provided with a threaded hole or a positioning pin with a threaded hole corresponding to each mounting hole. The screw passes through the mounting hole to match the threaded hole, so that the heat conducting plate 35 is connected to the plate body 33. In order to position the heater 34, the heat conducting plate 35 and the bottom wall of the positioning groove 32 are spaced apart to reserve a space for installing the heater 34.

In order to satisfy the requirement for the heat conducting plate 35 to dissipate the heat of the heater 34, the heat conducting plate 35 may be in direct contact with the heater 34. In some embodiments, the heat conducting plate 35 may also be spaced from the heater 34. Understandably, a heat conducting material can be filled between the heater 34 and the heat conducting plate 35. The heat conducting material may be aggregate.

In an embodiment of the present disclosure, the plate body 33 is an engraved structure. The plate body 33 is made of alloy material.

Figure 6:
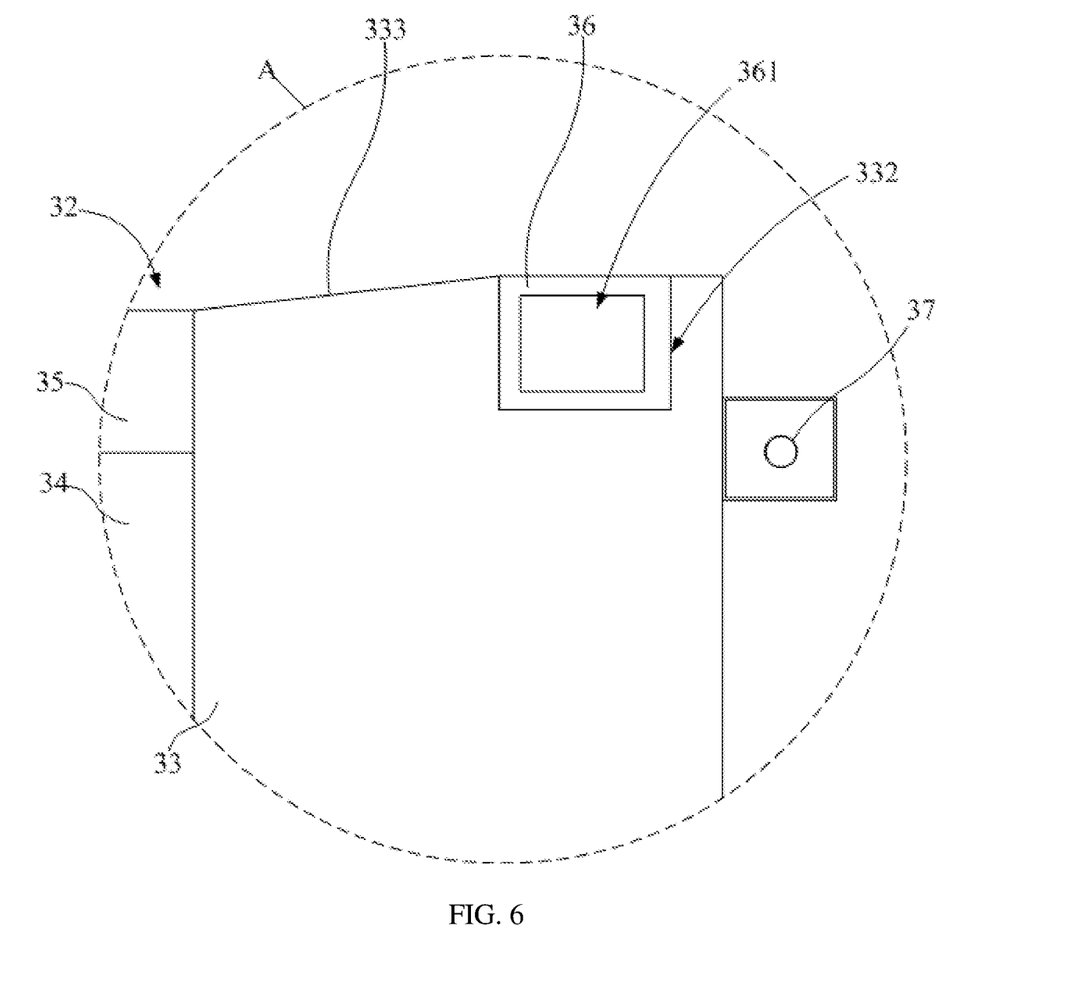
FIG. 6 is a partial enlarged view of portion A in FIG. 5.

In an embodiment of the present disclosure, as shown in FIG. 5 and FIG. 6, the plate body 33 is provided with a wedge-shaped edge 333 adjacent to a notch of the positioning groove 32. The wedge-shaped edge 333 surrounds the notch of the positioning groove 32. The wedge-shaped edge 333 is inclined from an outer side of the plate body 33 to a wall of the positioning groove 32. It should be understood that the wedge-shaped edge 333 is inclined from an outer side of the plate body 33 to a wall of the positioning groove 32, such that when the product is placed on the plate body 33, under the guidance of the wedge-shaped edge 333, one end of the outer side of the plate body 33 slides into the positioning groove 32 to facilitate positioning of the workpiece.

In an embodiment of the present disclosure, the plate body 33 is further provided with a sealing groove 332 adjacent to the notch of the positioning groove 32. The sealing groove 332 surrounds an outer periphery of the wedge-shaped edge 333. The drawer 3 further includes a sealing ring 36 provided in the sealing groove 332. The sealing ring 36 is provided with an air passage 361. The degassing system includes an air source mechanism. The air passage 361 is in communication with the air source mechanism. That is to say, the air source mechanism may be a mechanism independent of the degassing machine; the air source mechanism is a structure including an air outlet device for providing air with a stable pressure.

It should be understood that the drawer 3 further includes the sealing ring 36 provided in the sealing groove 332, such that the sealing ring 36 surrounds the positioning groove 32. When the drawer 3 slides into the containing groove 11, the drawer 3 is opposite to the upper cover 2. Then, the air is sent into the air passage 361 through the air source mechanism, and the sealing ring 36 is blown up; the sealing ring 36 is expanded to seal the positioning groove 32.

In order to seal the positioning groove 32, the upper cover 2 may also be provided with a sealing gasket. When the upper cover 2 covers the plate body 33, the sealing gasket surrounds the positioning groove 32 to seal the positioning groove 32. On the other hand, the drawer 3 and the upper cover 2 can also be locked by the driving assembly. In other words, the driving assembly drives the upper cover 2 or the drawer 3 to move vertically, so that the upper cover 2 and the drawer 3 approach and close the positioning groove 32. The driving assembly may be a cylinder.

Besides, when the drawer 3 needs to be drawn away from the containing groove 11, the air source mechanism stops working, the air in the air passage 361 is released to restore the state of the sealing ring 36 so that the drawer 3 can be drawn away from the containing groove 11.

In an embodiment of the present disclosure, the pipeline between the air source mechanism and the sealing ring 36 is in communication with the sealing ring 36 after passing through the slot of the containing groove 11 of the machine body 1.

Figure 4:
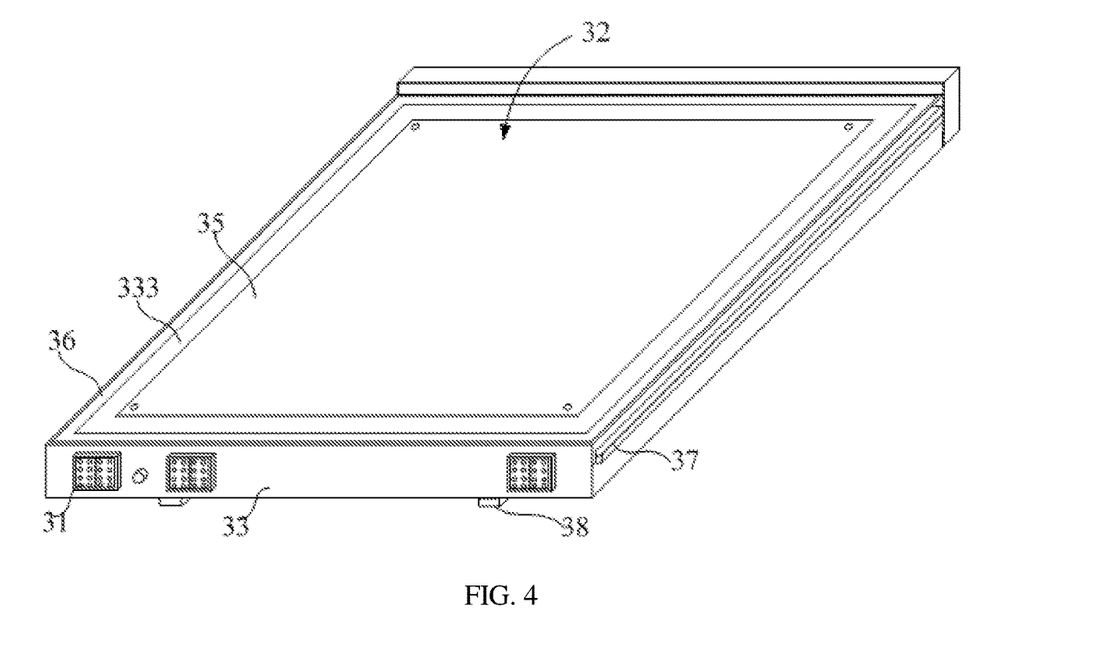
FIG. 4 is a schematic structural diagram of the drawer in FIG. 3 from another perspective.

In an embodiment of the present disclosure, the drawer 3 further includes a drag chain along one side of the plate body 33 and a hose 37 provided in the drag chain. The plate body 33 is provided with an air hole communicating with the sealing groove 332. One end of the hose 37 passes through the air hole to communicate with the air passage 361, and another end of the hose 37 is in communication with the air source mechanism. The drag chain is a common type of tank chain, which is not limited here.

In an embodiment of the present disclosure, the hose 37 communicates with the air passage 361, so that the air source mechanism can blow air into the air passage 361. The drag chain is provided on one side of the plate body 33 to protect the hose 37 and increase the bending radius of the hose 37 to avoid damage to the hose 37. The drag chain increases the bending radius of the hose 37 to avoid excessive bending of the hose 37 to block the pipeline.

It should be understood that the drag chain is a common type of drag chain. One end of the drag chain is connected to the plate body 33, and the other end of the drag chain is connected to the wall of the containing groove 11. When the drawer 3 slides in or out of the containing groove 11, the drag chain moves with the containing groove 11.

In order to facilitate the sliding of the drawer 3 in the containing groove 11, the drawer 3 may be provided with at least one channel. The wall of the containing groove 11 is provided with a convex portion corresponding to the channel, and the drawer 3 is slidably provided in the containing groove 11 through the cooperation of the convex portion and the channel. Alternatively, the drawer 3 may be provided with at least one convex portion. The groove of the containing groove 11 is provided with a sliding groove corresponding to the convex portion, and the drawer 3 is slidably provided in the containing groove 11 through the cooperation of the convex portion and the channel.

In an embodiment of the present disclosure, at least two slide rails 38 are provided on a side of the drawer 3 away from the upper cover 2. The wall of the containing groove 11 is provided with a slide way 111 corresponding to each of the at least two slide rails 38. The slide way 38 is slidably provided in the corresponding slide rail 111 to facilitate the smooth movement of the drawer 3. In other words, slide rails 38 are provided at both ends of the plate body 33.

In an embodiment of the present disclosure, the upper cover 2 is provided with an air flow channel. The degassing system includes a pressure control mechanism. The drawer 3 slides in the containing groove 11. The positioning groove 32 is covered by the upper cover 2. The air flow channel is in communication with the positioning groove 32 and the pressure control mechanism. The pressure control mechanism may be a structure including at least one air outlet device and a solenoid valve.

It should be understood that the master control circuit 4 controls the opening and closing of the solenoid valve. The master control circuit 4 sets a detection air pressure value according to production requirements. The detected air pressure value is the lowest pressure of the positioning groove 32 during production. That is to say, when the positioning groove 32 is closed, when the pressure value of the positioning groove 32 is sensed to be less than the minimum pressure, the master control circuit 4 controls the solenoid valve to open, which allows the air outlet device to input gas at a pressure into the positioning groove 32 to maintain a higher degassing effect.

Based on the above, the pressure control mechanism may be a mechanism relatively independent of the degassing machine.

In an embodiment of the present disclosure, the degassing machine further includes a driving mechanism provided in the containing groove 11. The driving mechanism is adjacent to the drawer 3. An output shaft of the driving mechanism is connected to the drawer 3. The driving mechanism drives the drawer 3 to move to realize automatic feeding and discharging.

Understandably, the driving mechanism may be a direct-drive motor or a driving module, and the drawer 3 can be driven to slide into or away from the containing groove 11, which is not limited here.

The present disclosure further provides a degassing machine applied to a degassing system. The degassing machine includes a machine body 1, a furnace body and a master control circuit 4. The specific structure of the machine body 1 and the furnace body refers to the above-mentioned embodiments. Since the degassing machine adopts all the technical solutions of all the above embodiments, it has at least all the beneficial effects brought by the technical solutions of the above embodiments, which will not be repeated here. The machine body 1 is provided with a containing groove 11, and an inner wall of the containing groove 11 is provided with an electric control terminal 12.

The furnace body includes an upper cover 2 fixed on a wall of the containing groove 11 and a drawer 3 slidably provided in the containing groove 11. The drawer 3 is provided with a contact terminal 31 corresponding to the electric control terminal 12. The side of the drawer 3 facing the upper cover 2 is further provided with a positioning groove 32 for placing a workpiece, and the upper cover 2 is provided with an air flow channel.

The master control circuit 4 is provided in the machine body 1, and the master control circuit 4 is electrically connected to the electric control terminal 12. Understandably, the master control circuit 4 is a circuit library including a useful control unit. In other words, the master control circuit 4 can be a common type of single-chip microcomputer.

The degassing system includes a pressure control mechanism. The pressure control mechanism is in communication with the air flow channel.

The drawer 3 slides into the containing groove 11, and the upper cover 2 covers the drawer 3. The pressure control mechanism communicates with the positioning groove 32 through the air flow channel, and the contact terminal 31 is connected to the electric control terminal 12.

In an embodiment of the present disclosure, the machine body 1 is provided with a plurality of containing grooves 11. The furnace body is provided in each of the containing grooves 11. The master control circuit 4 is electrically connected to each electric control terminal 12. The pressure control mechanism is in communication with each air flow channel.

The present disclosure further provides a degassing system. The degassing system includes a sucker mechanism and the degassing machine. The specific structure of the degassing machine refers to the above-mentioned embodiments. Since the degassing machine adopts all the technical solutions of all the above-mentioned embodiments, it has at least all the beneficial effects brought by the technical solutions of the above-mentioned embodiments, which will not be repeated here. The sucker mechanism is adjacent to the degassing machine, and the sucker mechanism sucks the workpiece to the drawer 3.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A degassing machine applied to a degassing system, comprising:
   a machine body defined with a containing groove, the containing groove being provided with an opening for a drawer sliding into, and an inner wall of the containing groove facing towards the opening being provided with an electric control terminal; and
   a furnace body, including:
      an upper cover fixed on a side wall of the containing groove; and
      the drawer slidably provided in the containing groove,
   wherein the drawer is provided with a contact terminal corresponding to the electric control terminal, and is for placing a workpiece, the drawer is for sliding into the containing groove, and covered by the upper cover, and the contact terminal is connected with the electric control terminal to energize the drawer.

2. The degassing machine of claim 1, wherein:
   one of the contact terminal and the electric control terminal is provided with at least one conductive elastic piece, and another of the contact terminal and the electric control terminal is provided with a conductive plate corresponding to the conductive elastic piece; and
   after the drawer slides into the containing groove, the conductive elastic piece is elastically abutted against the conductive plate.

3. The degassing machine of claim 1, wherein:
   the drawer comprises a plate body slidably provided in the containing groove, a heater, and a heat conducting plate connected to the plate body;
   the plate body is provided with a positioning groove for placing the workpiece;
   the heater and the heat conducting plate are provided in the positioning groove;
   the heater is between the heat conducting plate and a bottom wall of the positioning groove; and
   the contact terminal is provided on the plate body and electrically connected to the heater.

4. The degassing machine of claim 3, wherein:
   the plate body is provided with a wedge-shaped edge adjacent to a notch of the positioning groove;
   the wedge-shaped edge surrounds the notch of the positioning groove; and the wedge-shaped edge is inclined from an outer side of the plate body to a side wall of the positioning groove.

5. The degassing machine of claim 4, wherein:
the plate body is further defined with a sealing groove adjacent to the notch of the positioning groove; and
the sealing groove surrounds an outer periphery of the wedge-shaped edge.

6. The degassing machine of claim 5, wherein:
the drawer further comprises a sealing ring provided in the sealing groove;
the sealing ring is provided with an air passage;
the degassing system comprises an air source mechanism; and
the air passage is in communication with the air source mechanism.

7. The degassing machine of claim 6, wherein:
the drawer further comprises a drag chain along one side of the plate body and a hose provided in the drag chain;
the plate body is provided with an air hole communicating with the sealing groove; and
one end of the hose passes through the air hole to communicate with the air passage, and another end of the hose is in communication with the air source mechanism.

8. The degassing machine of claim 3, wherein:
the upper cover is provided with an air flow channel;
the degassing machine comprises a pressure control mechanism;
the positioning groove is covered by the upper cover; and
the air flow channel is in communication with the positioning groove and the pressure control mechanism.

9. The degassing machine of claim 3, wherein:
the degassing machine further comprises a driving mechanism provided in the containing groove;
the driving mechanism is adjacent to the drawer; and
an output shaft of the driving mechanism is connected to the drawer.

10. The degassing machine of claim 3, wherein the plate body is provided with a wire hole communicating with the positioning groove, the contact terminal is provided on the plate body, and the contact terminal is electrically connected to the heater via the wire hole.

11. The degassing machine of claim 1, wherein:
at least two slide rails are provided on a side of the drawer away from the upper cover;
the side wall of the containing groove is provided with a slide way corresponding to each of the at least two slide rails; and
each of the at least two slide rails is slidably provided in the corresponding slide way.

12. The degassing machine of claim 1, wherein the degassing machine also comprises a master control circuit, the electric control terminal is electrically connected to the master control circuit, and the master control circuit is for transmitting electric signals to the drawer through the electric control terminal and the contact terminal.

13. The degassing machine of claim 1, wherein at least one outer cover is provided on the contact terminal and/or the electric control terminal, and the at least one outer cover surrounds the contact end terminal and/or the electric control terminal.

14. A degassing system, wherein the degassing system comprises the degassing machine of claim 1 and a sucker mechanism adjacent to the degassing machine.

15. A degassing machine applied to a degassing system, comprising:
a machine body defined with a containing groove, the containing groove being provided with an opening for a drawer sliding into, and an inner wall of the containing groove facing towards the opening being provided with an electric control terminal;
a furnace body comprising an upper cover fixed on a side wall of the containing groove and the drawer slidably provided in the containing groove, the drawer being provided with a contact terminal corresponding to the electric control terminal, a side of the drawer facing the upper cover being provided with a positioning groove for placing a workpiece, the upper cover being provided with an air flow channel; and
a master control circuit provided in the machine body and electrically connected to the electric control terminal;
wherein the degassing system includes a pressure control mechanism, and the pressure control mechanism is in communication with the air flow channel;
the drawer is for sliding into the containing groove and covered by the upper cover, the pressure control mechanism is in communication with the positioning groove through the air flow channel, and the contact terminal is connected to the electric control terminal.

16. A degassing system, wherein the degassing system comprises the degassing machine of claim 15 and a sucker mechanism adjacent to the degassing machine.

* * * * *